United States Patent
Tew et al.

(10) Patent No.: US 9,559,533 B2
(45) Date of Patent: Jan. 31, 2017

(54) DETACHABLE CHARGING SYSTEM FOR A VEHICLE

(71) Applicant: Amphenol Tecvox, LLC, Madison, AL (US)

(72) Inventors: Kum W. Tew, Madison, AL (US); Jomy Jose, Madison, AL (US)

(73) Assignee: Amphenol Tecvox, LLC, Madison, AL (US)

( * ) Notice: Subject to any disclaimer, the term of this patent is extended or adjusted under 35 U.S.C. 154(b) by 98 days.

(21) Appl. No.: 14/532,622

(22) Filed: Nov. 4, 2014

(65) Prior Publication Data

US 2015/0123598 A1    May 7, 2015

Related U.S. Application Data

(60) Provisional application No. 61/899,367, filed on Nov. 4, 2013.

(51) Int. Cl.
*H02J 7/00* (2006.01)
*B60R 16/02* (2006.01)
*B60R 16/03* (2006.01)

(52) U.S. Cl.
CPC ............ *H02J 7/0042* (2013.01); *B60R 16/03* (2013.01); *H02J 7/0047* (2013.01); *H02J 7/0052* (2013.01); *H02J 2007/005* (2013.01)

(58) Field of Classification Search
CPC ...... H02J 7/0042; H02J 7/0047; H02J 7/0052; H02J 2007/005; B60R 16/02
USPC ........................................................ 320/107
See application file for complete search history.

(56) References Cited

U.S. PATENT DOCUMENTS

| | | | |
|---|---|---|---|
| 5,982,149 A | 11/1999 | Shih | |
| 6,493,220 B1 | 12/2002 | Clark et al. | |
| 7,268,519 B2 | 9/2007 | Simoes et al. | |
| 7,883,458 B2 * | 2/2011 | Hamel | A61B 17/32002 600/1 |
| 7,917,109 B2 | 3/2011 | Becker et al. | |
| 7,918,685 B1 | 4/2011 | Kruckenberg | |
| 7,948,208 B2 | 5/2011 | Partovi et al. | |
| 8,284,978 B1 | 10/2012 | Strauser | |
| 8,311,256 B1 | 11/2012 | Strauser | |
| 8,432,667 B2 | 4/2013 | Strauser | |
| 2007/0080663 A1 | 4/2007 | Obering | |
| 2007/0182367 A1 | 8/2007 | Partovi | |
| 2008/0238356 A1 | 10/2008 | Batson et al. | |
| 2009/0048854 A1 | 2/2009 | Laitinen | |
| 2009/0292851 A1 | 11/2009 | Mead et al. | |
| 2010/0105329 A1 | 4/2010 | Durand et al. | |
| 2010/0138581 A1 | 6/2010 | Bird et al. | |

(Continued)

Primary Examiner — Sun Lin
(74) Attorney, Agent, or Firm — Blank Rome LLP

(57) ABSTRACT

A detachable charging system for a vehicle including an interface device that receives power from the vehicle and outputs the power to a detachable charging unit that detachably couples with and electrically connects to the interface device. The detachable charging unit includes a power storage device. The detachable charging unit outputs power stored in the power storage device to a mobile device when the detachable charging unit is detached from the interface device. The detachable charging unit outputs power received from the interface device and/or stored in the power storage device to the mobile device when the charging unit is electrically connected to the interface device.

20 Claims, 6 Drawing Sheets

(56) References Cited

U.S. PATENT DOCUMENTS

| | | |
|---|---|---|
| 2011/0084660 A1 | 4/2011 | McSweyn |
| 2011/0134601 A1 | 6/2011 | Sa |
| 2011/0188197 A1 | 8/2011 | Jackson |
| 2011/0221129 A1 | 9/2011 | Sisson et al. |
| 2012/0092265 A1 | 4/2012 | Williams et al. |

* cited by examiner

DETACHABLE CHARGING SYSTEM FOR A VEHICLE

CROSS REFERENCE TO RELATED APPLICATION

This application claims priority to U.S. Provisional Application No. 61/899,367, filed on Nov. 4, 2013, the entire contents of which are hereby incorporated by reference.

FIELD OF THE INVENTION

This application relates to a charging system for a vehicle and, more specifically, to a detachable charging unit configured to store power received from a vehicle electric system in a power storage device and output power received from an electric system of the vehicle and/or stored in the power storage device to a mobile device.

BACKGROUND OF THE INVENTION

Users increasingly rely on rechargeable mobile devices. Mobile devices may be operated for longer periods and may use more energy intensive hardware such as Global Positioning Systems (GPS) and wireless networking. Accordingly, as the utility and processing power of mobile devices increases, the battery life of mobile devices decreases. Therefore, the battery life of mobile devices may be insufficient for the mobile device to maintain power for a desired time period (for example, an entire day). Conventional adapters enable a user to recharge a mobile device using the electric system of a vehicle. In order to recharge a mobile device, however, conventional adapters must be directly connected to both the mobile device and the electric system of a vehicle. If a user wants to leave the vehicle, conventional adapters are unable to provide additional power to the rechargeable mobile device.

SUMMARY OF THE INVENTION

In accordance with an aspect of the present invention, there is provided a charging system for a vehicle. The system includes an interface device that receives power from the vehicle and outputs the power to a detachable charging unit that detachably couples with and electrically connects to the interface device. The detachable charging unit includes a power storage device. The detachable charging unit outputs power stored in the power storage device to a mobile device when the detachable charging unit is detached from the interface device. The detachable charging unit outputs power received from the interface device and/or stored in the power storage device to the mobile device when the detachable charging unit is electrically connected to the interface device.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings.

DETAILED DESCRIPTION OF THE INVENTION

Figure 1A:
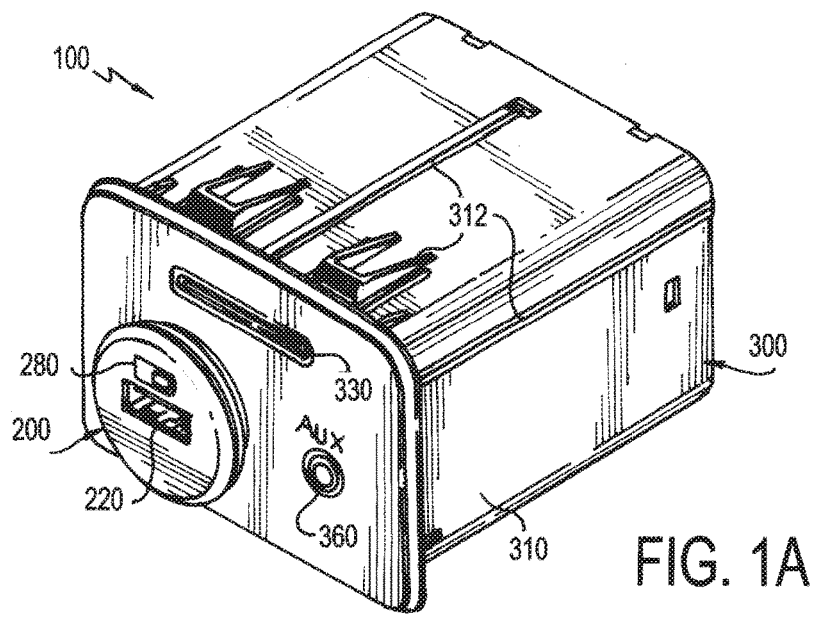
FIGS. 1A and 1B illustrate a charging system 100 according to an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

Figure 1B:
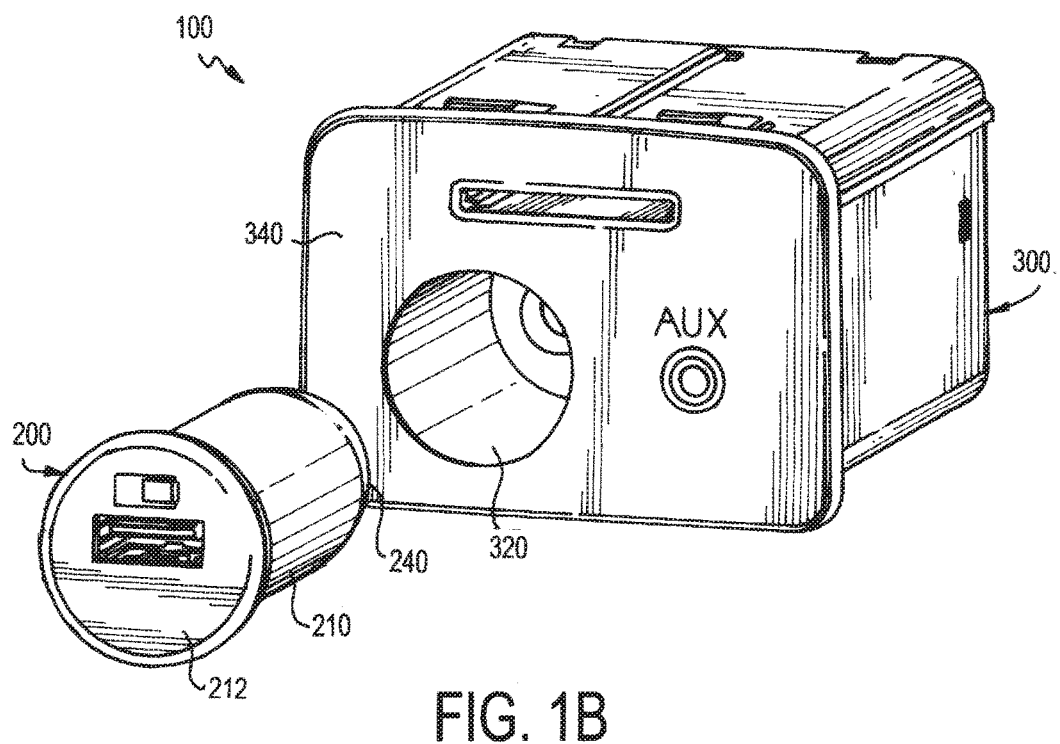

FIGS. 1A and 1B illustrate a charging system 100 according to an exemplary embodiment of the present invention. The charging system 100 includes a detachable charging unit 200 and an interface device 300. The detachable charging unit 200 includes a mobile device port 220 and a docking port 240. The detachable charging unit 200 may also include a visual indicator 280. The interface device 300 includes a charging unit port 340. The interface device 300 may also include a charging unit compartment 320. The interface device 300 may also include audio and/or data ports such as an audio port 360 and a data port 380.

The interface device 300 may be configured to electrically and mechanically couple to a vehicle. More specifically, the interface device 300 may be configured to mechanically couple to an interior console or instrument panel of a vehicle. As illustrated in FIGS. 1A and 1B, for example, the interface device 300 may include a housing body 310 molded and/or assembled to physically interface with the console or instrument panel. For example, the shape of the body 310 may be such that the interface device 300 enters a compartment of the console or instrument panel. Because the housing body 310 of the interface device 300 is separate from the detachable charging unit 200, the interface device 300 enables easy installation in a vehicle. In the exemplary embodiment illustrated in FIGS. 1A and 1B, the body 310 of interface device 300 is elongated with a substantially rectangular cross section. The body includes a rear, four sides and a flat face plate larger than the body 310. The larger flat face plate enables easy installation in a vehicle. The charging unit compartment 320 and additional ports (such as an audio port 360 and a data port 380) are provided at the front face plate for each of use. The interface device 300 is configured to be slidably and lockably mounted to a vehicle instrument panel while also being removable in the event that repair and/or replacement is needed.

The interface device 300 may also include one or more locking or guide mechanisms 312 configured to guide the interface device 300 into the compartment of the console or instrument panel and/or hold the interface device 300 inside the compartment of the console or instrument panel. The locking or guide mechanisms 312 may include one or more tabs, slots, grooves, etc. The locking or guide mechanisms may be located on one or more of the sides of the housing 310 including the top, left side, right side, and/or bottom of the housing. In other exemplary embodiment, the body 310 may have a different configuration. In another exemplary embodiment, multiple interface devices 300 may be produced with different bodies 310, each configured to interface with different vehicles.

The detachable charging unit 200 and the interface device 300 are molded and/or assembled such that the detachable charging unit 200 physically interfaces with and couples to the interface device 300. As illustrated in FIGS. 1A and 1B, for example, the interface device 300 may include a charging unit compartment 320 configured to physically receive the charging unit 200 and the charging unit 200 may include a housing 210 molded and/or assembled to enter the charging unit compartment 320. The housing 210 may have an elongated shape that is slidably received by the charging unit compartment 320. The housing 210 may be a round elongated cylinder with a round face. The housing 210 is shorter than the interface device 300. When physically interfacing with the charging unit compartment 320, the housing 210 may be held in place, for example, by friction, locking channels, or other locking mechanisms. As described below, however, the charging unit 200 is molded and/or assembled such that a user may easily detach the charging unit 200 from the interface device 300 and remove the charging unit 200 from the charging unit compartment 320.

The docking port 240 of the charging unit 200 is configured to electrically connect to the charging unit port 340 of the interface device 300. For example, the docking port 240 of the charging unit 200 may mate with and form an electrical connection with the charging unit port 340 of the interface device 300 when the male housing 210 of the charging unit 200 is inside the female charging unit compartment 320 of the interface device 300 as shown in FIG. 1A. The charging unit port 340 may include one or more electrical connectors configured to supply power to the charging unit 200 via the docking port 240 and the docking port 240 may include one or more electrical connectors configured to receive power from the interface device 300 via the charging unit port 340. The charging unit port 340 may also include one or more electrical connectors configured to send and/or receive data to/from the charging unit 200 via the docking port 240 and the docking port 240 may include one or more electrical connectors configured to send and/or receive data to/from the interface device 300 via the charging unit port 340. As described below, the docking port 240 may also include one or more electrical connectors configured to send and receive data to and from the charging unit port 340 and the charging port 340 may include one or more electrical connectors configured to send and receive data to and from the docking port 240. The electrical connectors may be male and/or female electrical connectors.

The charging unit 200 is configured to physically and electrically detach from the interface device 300 as shown in FIG. 1B. The charging unit 200 may also include a flange 212. In order to enable a user to grip the charging unit 200 and detach it from the interface device 300, the flange 212 may extend out from the face of the interface device 300 as shown in FIGS. 1A and 1B.

The mobile device port 220 may be any suitable port configured to electrically connect the detachable charging connector 200 to mobile devices. The mobile device port 220 may be configured to electrically connect with any mobile device, including a cellular phone, a tablet computer, a notebook computer, a smart watch, a peripheral device, etc. The mobile device port(s) 220 is configured to supply electric power to the mobile device to charge or recharge the battery of the mobile device. The mobile device port 220 may also be configured to send data to and/or receive data from the mobile device. In the exemplary embodiment illustrated in FIGS. 1A and 1B, for example, the mobile device port 220 may be a Universal Serial Bus (USB) port. In other exemplary embodiments, the mobile device port 220 may be a Firewire port, a Peripheral Component Interconnect Express (PCIe) port, a Thunderbolt port, or any other proprietary or non-proprietary connector either currently known or developed in the future. In another exemplary embodiment, the mobile device port 220 may also be a pad (or any other device) configured to wirelessly charge the mobile device. The mobile device port 220 may be configured to wirelessly transmit and receive data from the mobile device via, for example, Bluetooth, Near Field Communication (NFC), etc.

The interface device 300 may also include additional audio and/or data ports. For example, the interface device 300 may include an additional audio port 360 such the 3.5 mm connector illustrated in FIGS. 1A and 1B. The interface device may also include an additional data port 380 such as the Serial Peripheral Interface (SDI) illustrated in FIGS. 1A and 1B. As one of ordinary skill in the art will recognize, ports such as the audio port 360 and data port 380 may be configured to send and/or receive both audio signals and other data signals and may also be configured to transmit electric power. Alternatively or additionally, the interface device 300 may include component video ports, composite video ports, a stereo audio port, a High Definition Multimedia Interface (HDMI) port, an auxiliary input, a universal serial bus (USB) port, a micro-USB port, an IEEE 1394 (Firewire) port, a port for a subscriber identification module (SIM) card, or any other proprietary or non-proprietary connector either currently known or developed in the future.

Figure 2:
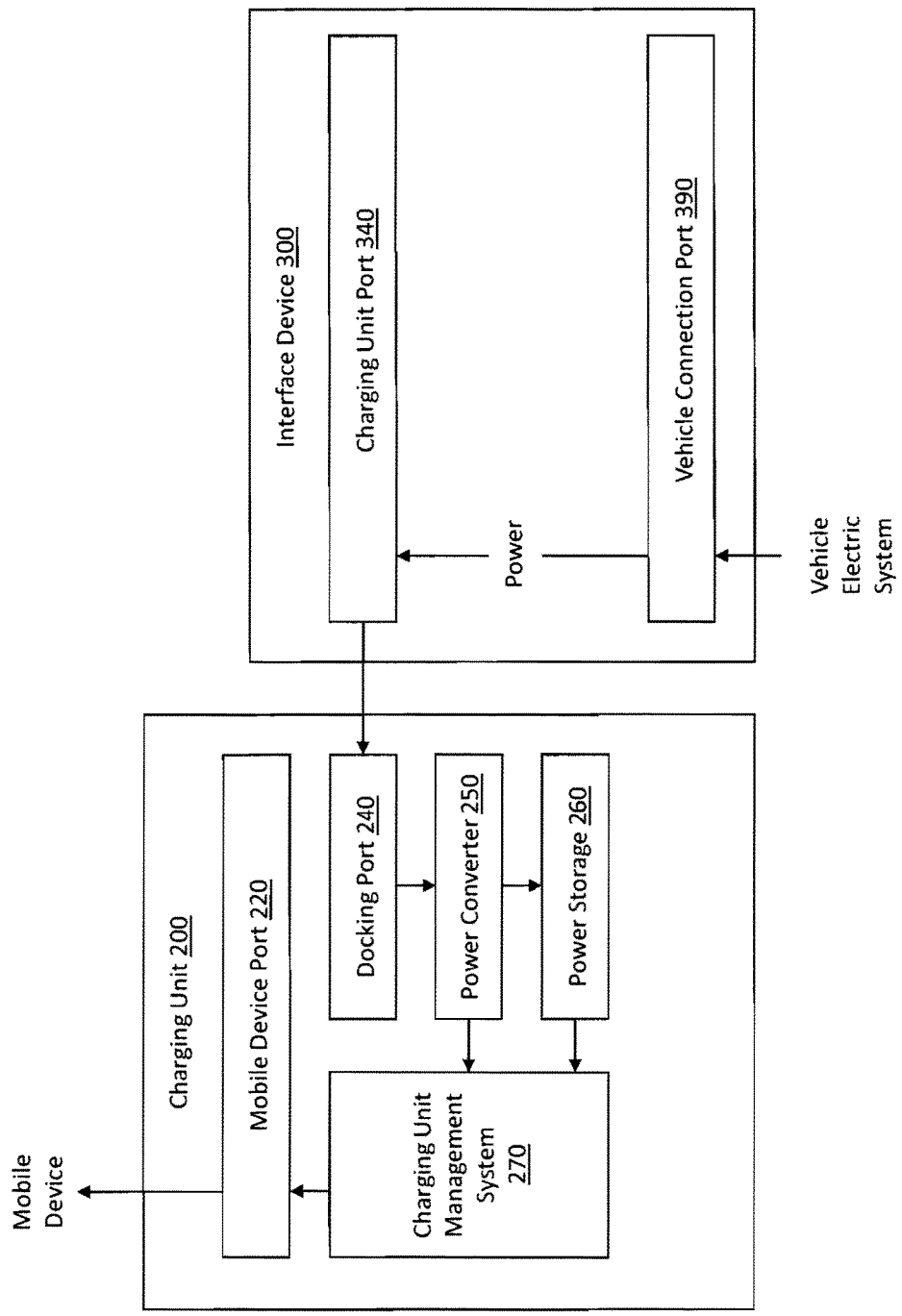
FIG. 2 is a block diagram of the charging system illustrated in FIGS. 1A and 1B according to an exemplary embodiment of the present invention.

FIG. 2 is a block diagram of the charging system 100 illustrated in FIGS. 1A and 1B according to an exemplary embodiment of the present invention.

As shown, the detachable charging unit 200 includes the mobile device port, the docking port 240, a power converter 250 a power storage device 260, and a charging unit management system. The interface device 300 includes the charging unit port 340 and a vehicle connection port 390.

The interface device 300 is configured to receive power (as indicated by the solid arrows in FIG. 2) from a vehicle electric system (e.g., electric power generated by a vehicle alternator and/or stored in a vehicle battery) via the vehicle connection port 390 and output power received from the vehicle electric system to the charging unit port 340. The charging unit 200 is configured receive power from the interface device 300 via the docking port 240, store the power received from the interface device 300 in the power storage device 260, and output the power received from the interface device 300 and/or the power stored in the power storage device 260 to a mobile device via the mobile device port 220.

The vehicle connection port 390 may include one or more electrical connectors configured to receive power from a vehicle electric system. The vehicle connection port 390 may also include wires or a snap connection to mate with the vehicle bus. As described below, the vehicle connection port 390 may also include one or more electrical connectors configured to send and receive data to and from the vehicle electronic system. The electrical connectors may be male and/or female electrical connectors.

As discussed above, the mobile device port 220 may be any suitable port configured to electrically connect the detachable charging connector 200 to a mobile device and the docking port 240 may be any suitable device configured to electrically connect to the charging unit port 340.

The power converter 250 may be any suitable device configured to convert power received from the vehicle's electric system. The power converter may be, for example, a DC-to-DC converter configured to convert 12 volt power received from the vehicle's electric system to a desired voltage to charge and recharge the power storage device 260 of the charging unit 200 and/or a battery of a mobile device connected to the charging unit 200 via the mobile device port 220.

The power storage device 260 may be any suitable device configured to store electric power. The power storage device 260 may include, for example, one or more rechargeable batteries. When the charging unit 200 is detached from the interface device 300, the charging unit 200 is configured to output power stored in the power storage device 260 to a mobile device. Additionally, when the charging unit 200 is electrically connected to the interface device 300, the charging unit 200 is configured to output the power received from the interface device 300 to the mobile device and/or output the power stored in the power storage device 260 to the mobile device. As described above, the charging unit 200 may be configured to output power from the interface device 300 and/or the power storage device 260 to the mobile device via either a wired connection (e.g., the mobile device port 220) or a wireless connection.

The charging unit 200 may also include a charging unit management system 270 configured to control the charging unit 200. For example, the charging unit management system 270 may determine whether the charging unit 200 is electrically connected to the interface device 300 based on the input voltage of the docking port 240. If the charging unit 200 is not electrically connected to the interface device 300 and a mobile device is electrically connected to the charging unit 200 via the mobile device port 220, the charging unit management system 270 may control the charging unit 200 such that electrical power stored in the power storage device 260 is output to the mobile device via the mobile device port 200. If the charging unit 200 is electrically connected to the interface device 300 and a mobile device is electrically connected to the charging unit 200 via the mobile device port 220, the charging unit management system 270 may control the charging unit 200 such that electrical power received from the interface device 300 via the docking port 240 is output to the mobile device via the mobile device port 220.

Alternatively, when the charging unit 200 is electrically connected to the interface device 300 and a mobile device is electrically connected to the charging unit 200 via the mobile device port 220, the charging unit management system 270 may control the charging unit 200 such that electrical power received from the interface device 300 via the docking port 240 is stored in the power storage device 260 and electrical power stored in the power storage device 260 is output to the mobile device via the mobile device port 220.

Alternatively, when the charging unit 200 is electrically connected to the interface device 300 and a mobile device is electrically connected to the charging unit 200 via the mobile device port 220, the charging unit management system 270 may control the charging unit 200 such that electrical power received from the interface device 300 via the docking port 240 is output to the mobile device via the mobile device port 220 and additional electrical power not output to the mobile device is used to charge the power storage device 260.

The charging unit management system 270 may also be configured to control and/or regulate the charging of the power storage device 260. For example, the charging unit management system 270 may be configured to (a) measure the temperature of the power storage device 260; (b) reduce or stop the flow of power from the power source (e.g., the vehicle's electric system via the interface device) to the power storage device 260 if the temperature of the power storage device 260 falls outside of an acceptable range; (c) recharge the power storage device 260 in phases, such as a conditional phase, constant current phase and constant voltage phase; (d) determine an amount of charge of the power storage device 260; and/or (e) discontinue the flow of power from the power source to the power storage device 260 in response to a determination that the power storage device 260 is fully charged or recharged.

Additionally or alternatively, the charging unit management system 270 may be configured to control and/or regulate the charging of a battery of a mobile device connected to the charging unit 200 via the mobile device port 220. The charging unit management system 270 may be configured to (a) detect the presence of a battery of the mobile device; (b) determine if the battery of the mobile device requires recharging; (c) determine an amount of charge of the battery of the mobile device; and/or (d) discontinue the flow of power from the power source to the battery of the mobile device in response to a determination that the battery of the mobile device is fully charged or recharged.

The charging unit management system 270 may be any suitable device configured to manage and/or control the charging unit 200. The charging unit management system 270 may include an integrated circuit.

Figure 3:
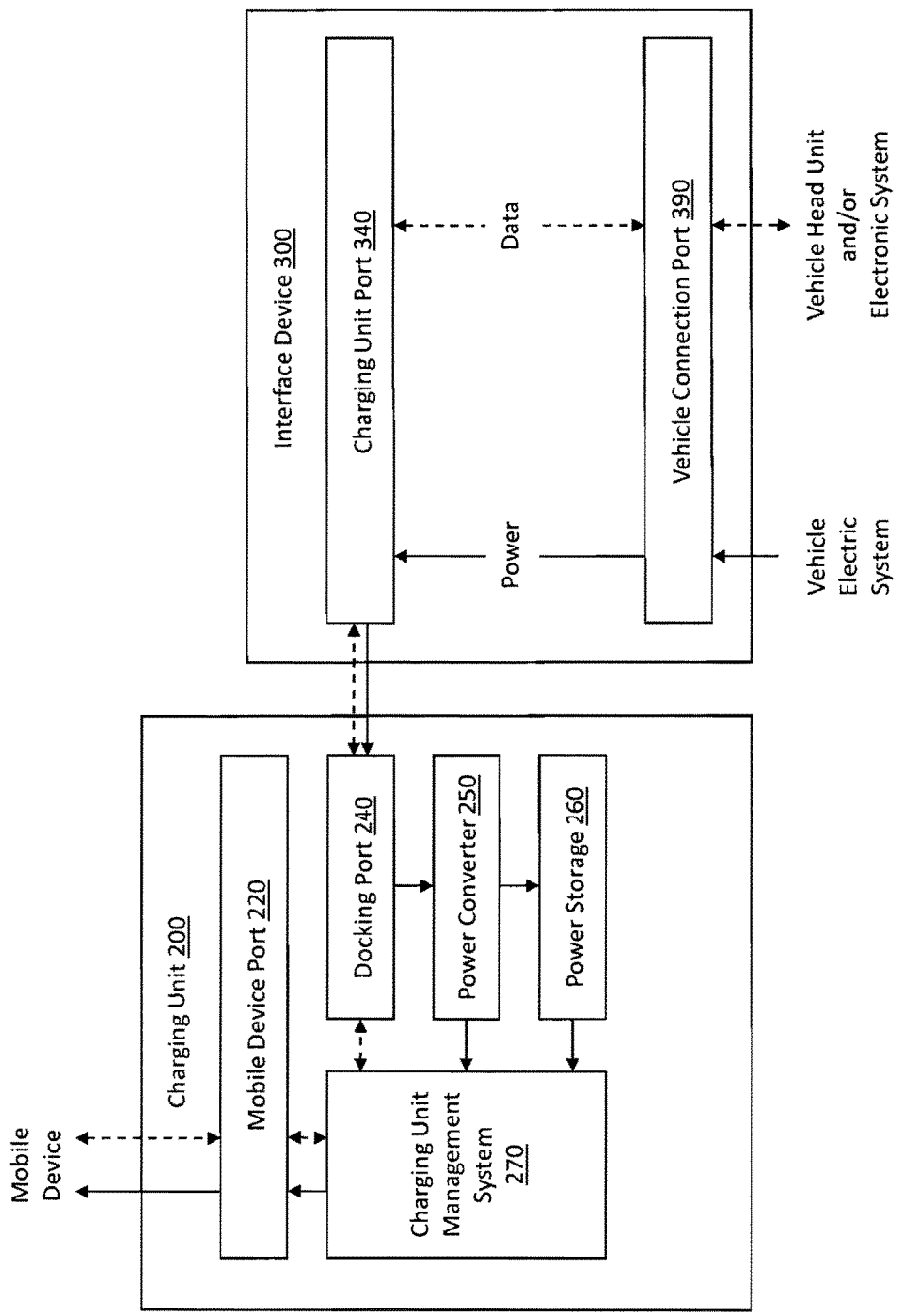
FIG. 3 is a block diagram of the charging system illustrated in FIGS. 1A and 1B according to another exemplary embodiment of the present invention.

FIG. 3 is a block diagram of the charging system 100 illustrated in FIGS. 1A and 1B according to another exemplary embodiment of the present invention.

Referring to FIG. 3, the interface device 300 may be configured to send and receive data (as illustrated by the dashed arrows) to and from a vehicle electronic system via the vehicle connection port 390. The interface device 300 may also be configured to send and receive data to and from the charging unit 200 via the charging unit port 340. The charging unit may be configured to send and receive data to and from the interface device 300 via the docking port 240 and to send and receive data to and from a mobile device via the mobile device port 220.

For example, the interface device 300 may output audio signals in digital or analog format to the head unit (e.g., the radio) of the vehicle. The audio signals may be received, for example, from a mobile device via the mobile device port 220 of the charging unit 200. Alternatively or additionally, the interface device 300 may output audio signals received via the audio port 360. Data signals output by the interface device 300 may also bypass the head unit of the vehicle and be output directly to the vehicle's electronic system. The charging unit management system 270 may be configured to manage and/or control the communication to/from the charging unit 200.

The interface device 300 may also be configured to output data signals from a mobile device to enable the mobile device to control or utilize the vehicle's electronic system. For example, data signals received from a mobile device and output by the interface device 300 may control the vehicle's electronic system to change the mode of the vehicle's radio to output audio from the mobile device. In another example, the mobile device may pause or mute the output of a vehicle's radio in response to an incoming phone call, to output audible turn-by-turn directions, etc. The incoming phone call and/or turn-by-turn directions may be output via the vehicle's audio system.

As described above, the charging unit management system 270 may control and/or regulate the charging of a battery of a mobile device connected to the mobile device port 220. Specifically, the charging unit management system 270 may detect the presence of the battery of the mobile device and or determine the amount of charge of the battery of the mobile device via a voltage detector included in the charging unit 200. The charging unit management system 270 may detect the presence of the battery of the mobile device and or determine the amount of charge of the battery of the mobile device by sending and receiving data signals to and from the mobile device via the mobile device port 220. For example, the charging unit management system 270 may initiate communication with the interface device 300 when the charging unit 200 is coupled to the interface device 300 after having been detached.

Figure 4:
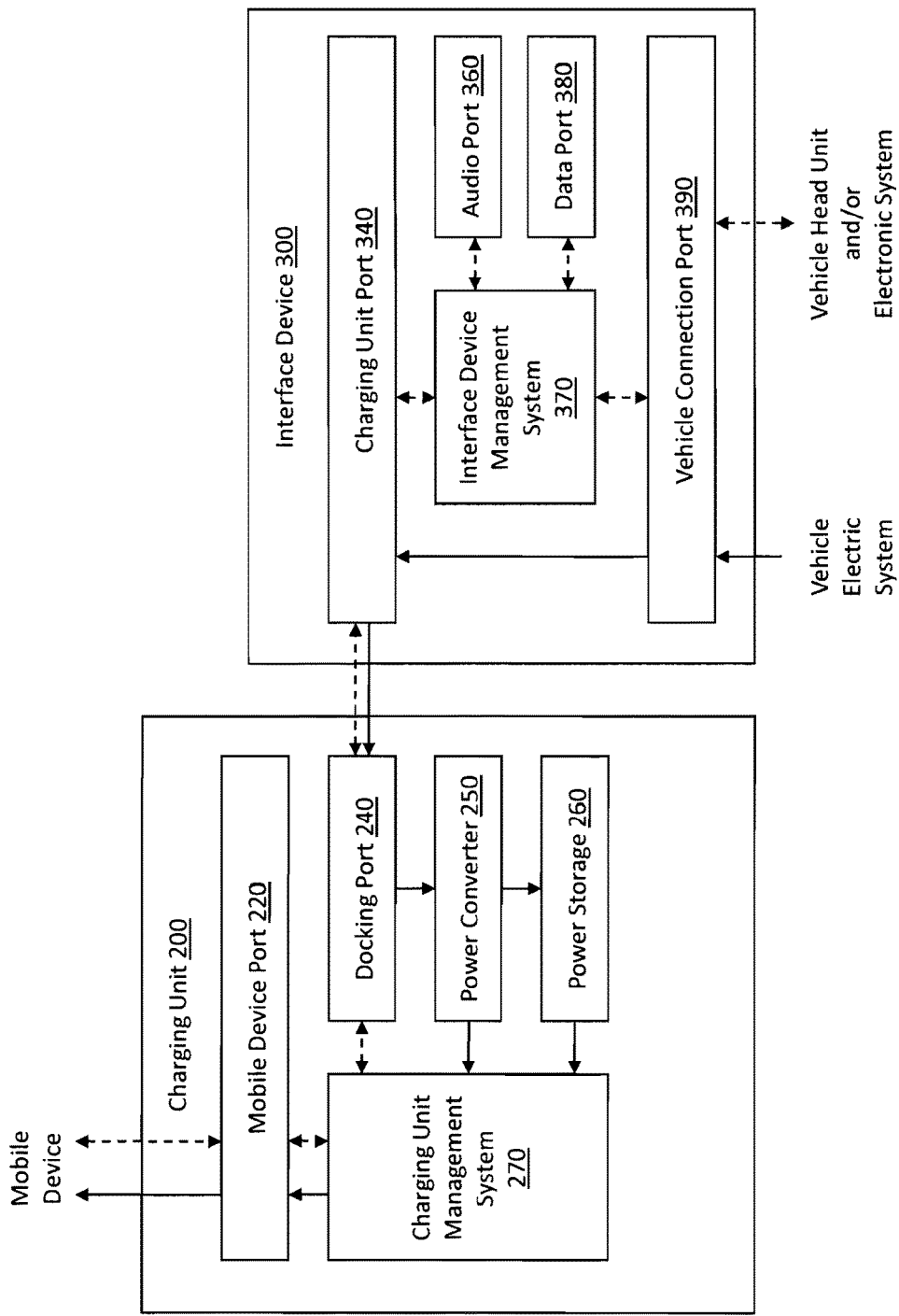
FIG. 4 is a block diagram of the charging system illustrated in FIGS. 1A and 1B according to another exemplary embodiment of the present invention.

FIG. 4 is a block diagram of the charging system 100 illustrated in FIGS. 1A and 1B according to another exemplary embodiment of the present invention.

Referring to FIG. 4, the interface device 300 may also include an interface device management system 370. The interface device management system 370 may include any suitable device configured to facilitate communication of data between the interface device 300 and the charging unit 100 and/or the vehicle. For example, the interface device management system 370 may output a data signal to the vehicle indicating that the power storage device 260 and/or the battery of a mobile device connected to the mobile device port is fully charged in response to a data signal from the charging unit 200 that the power storage device 260 and/or the battery of the mobile device is fully charged. The interface device management system 370 may also electrically connect additional ports of the interface device 300 (such as the audio port 360 and/or the data port 380 illustrated in FIGS. 1A and 1B) to the vehicle. The interface device management system 370 may include signal conditioning circuitry configured to condition the power and/or data received via the vehicle connection port 390 and output by the charging unit port 340. In this instance, the signal condition circuitry may be electrically connected between the vehicle connection port 390 and the charging unit port 340.

The interface device management system 370 may communicate with the vehicle electronic system to enable the detachable charging system 100 and/or a mobile device connected to the mobile device port 220 to control or utilize the vehicle's electronic system. For example, interface device management system 370 may output data signals to the vehicle electronic system to change the mode of the vehicle's radio (e.g., to output audio received from a mobile device connected to the mobile device port 220, audio received via the audio port 360, or audio files received via the data port 380). Additionally, the interface device management system 370 may output control signals to the vehicle electronic system to, for example, pause or mute the output of a vehicle radio in response to an incoming phone call, to output audible turn-by-turn directions, etc. The interface device management system 370 may output and/or receive data signals to/from the vehicle electronic system such that the incoming phone call and/or turn-by-turn directions may be output via the vehicle's audio system.

Additionally or alternatively, the interface device management system 370 may enable the detachable charging system 100 to receive data from multiple sources and selectively output data to the vehicle electronic system. For example, the charging unit 200 may include a plurality of mobile device ports 220 and the interface device management system 370 may selectively output audio and/or other data signals based on data received from one of a plurality of mobile devices electrically connected to the mobile device ports to the vehicle electronic system. Similarly, the interface device management system 370 may selectively output audio and/or other data signals to the vehicle control system based on data received via the mobile device port 220, the audio port 360, the data port 380, and/or any other port included in the charging unit 200 and/or the interface device 300.

The interface device management system 370 may be any suitable device configured to manage and/or control the interface device 300 and/or enable communications between the interface device 300 and the charging unit 200, one or more mobile devices electrically connected to the mobile device port 220, and/or a vehicle connected to the interface device 300 via the vehicle connection port 390. The interface device management system 370 may include an integrated circuit.

Figure 5:
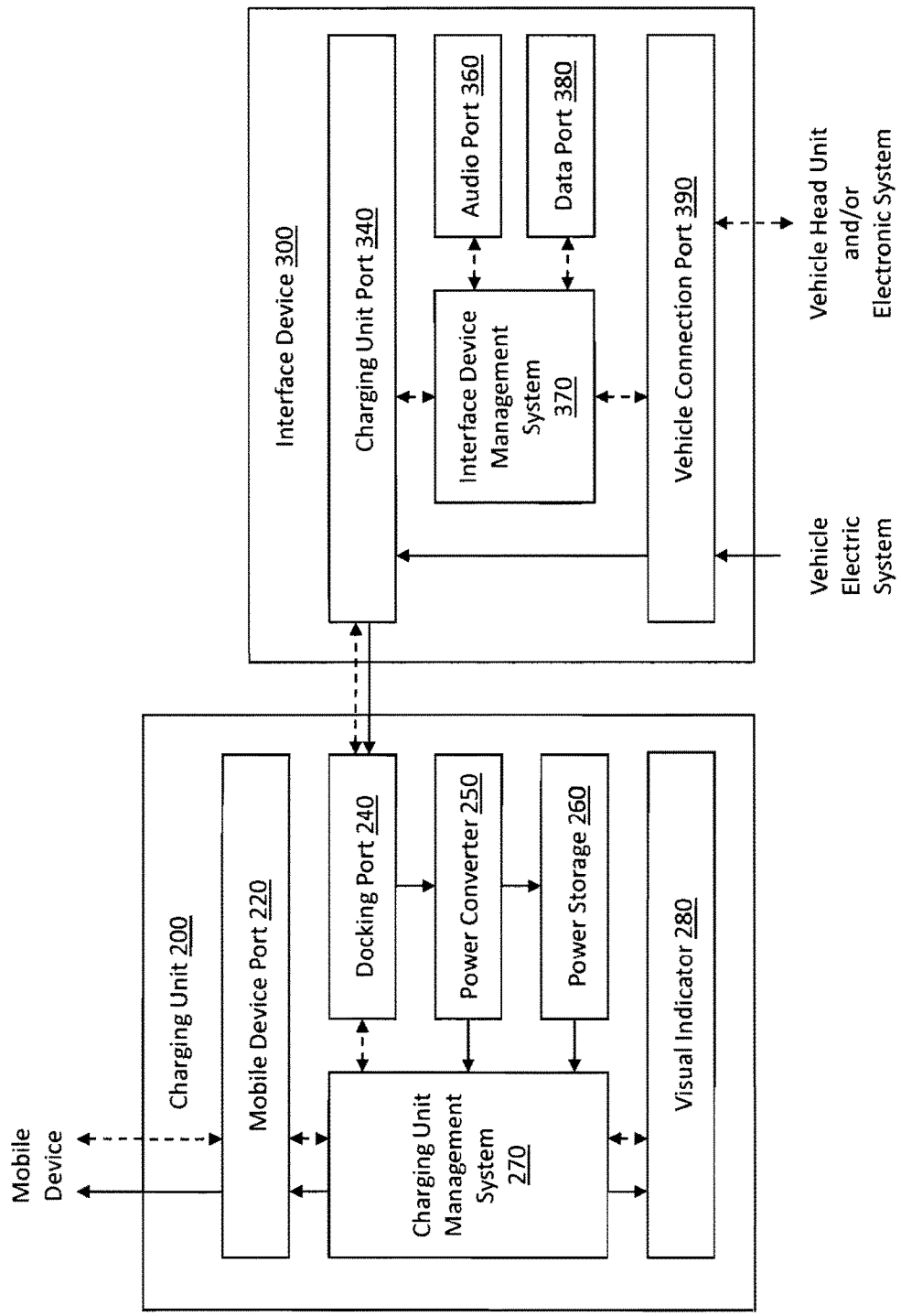
FIG. 5 is a block diagram of the charging system illustrated in FIGS. 1A and 1B according to another exemplary embodiment of the present invention.

FIG. 5 is a block diagram of the charging system 100 illustrated in FIGS. 1A and 1B according to another exemplary embodiment of the present invention.

Referring to FIG. 5, the charging unit 200 may also include a visual indicator 280 (as shown, for example, in FIGS. 1A and 1B). The visual indicator may be any suitable device configured to selectively emit or reflect light. For example, the visual indicator may include one or more light emitting diodes (LEDs) or any other suitable display. Alternatively, the charging unit 200 may also include an audible indicator in addition to or in lieu of the visual indicator 280.

The visual indicator 280 may be configured to visually indicate the amount of power stored in the power storage device 260 and/or the amount of power stored in the power supply of a mobile device electrically connected to the mobile device port 220. Additionally or alternatively, the visual indicator 280 may be configured to output an indication of a problem with the interface device 300, the charging unit 200, the power storage device 260, and/or a mobile device electrically connected to the mobile device port 220. The visual indicator 280 may also be configured to output other messages from the vehicle or a mobile device electrically connected to the mobile device port 220. Additionally or alternatively, the charging unit may include an audible indicator (such as a speaker). Additionally or alternatively, the visual indicator 280 may output an indication to the user regarding the state of a mobile device connected to the charging unit via the mobile device port 220.

The mobile device management system 270 may be configured to determine the amount of power stored in the power storage device 260 and/or the amount of power stored in the power supply of a mobile device electrically connected to the mobile device port 220. Additionally or alternatively, the mobile device management system 270 may control the visual indicator 280 such that the visual indicator 280 outputs an indication indicative of the amount of power stored in the power storage device 260 and/or the amount of power stored in the power supply of the mobile device electrically connected to the mobile device port 220. Additionally or alternatively, the mobile device management system 270 may be configured to determine whether there is a problem with the interface device 300, the charging unit 200, the power storage device 260, and/or a mobile device electrically connected to the mobile device port 220. Additionally or alternatively, the mobile device management system 270 may control the visual indicator 280 such that the visual indicator 280 outputs an indication indicative of a problem with the interface device 300, the charging unit 200, the power storage device 260, and/or a mobile device electrically connected to the mobile device port 220.

The visual indicator 280 may include a first indicator configured to output an indication regarding the charge state of a mobile device connected to the charging unit 200 via mobile device port 220. For example, the mobile device may output a signal to the charging unit 200 that the battery of the mobile device is fully charged. In this example, the first indicator may emit or reflect light to indicate that the battery of the mobile device is fully charged. Alternatively, the first indicator may output multiple indications indicative of multiple charge states of the mobile device.

In one exemplary embodiment, the first indicator may output multiple indications by outputting light in more than one color. In this embodiment, for example, the first indicator may (a) indicate to a user that the mobile device is fully charged by outputting green light; (b) indicate to the user that the mobile device is not fully charged by not outputting light; and (c) indicate to the user that a problem has occurred with the mobile device or detachable charging unit by outputting red light.

In another exemplary embodiment, the first indicator may output multiple indications by outputting light in more than one shape. As illustrated in FIGS. 1A and 1B, for example, the first indicator may output an image of a battery. The first indicator may output (a) an image of an empty battery in response to a signal from the mobile device that the mobile device battery is empty or nearly empty; (b) an image of a full battery in response to a signal from the mobile device that the mobile device battery is fully charged or nearly fully charged; and/or (c) an image proportional to the amount of charge of the mobile device battery.

In another exemplary embodiment, the first indicator may output multiple indications out outputting light with more than one intensity level. In this example, the brightness of the light output by the first indicator may be indicative of the amount of charge of the mobile device battery.

The visual indicator 280 may include a second indicator configured to output an indication regarding the charge state of the power storage device 260 of the charging unit 200. For example, the second indicator may output (e.g., emit or reflect) light to indicate that the power storage device 260 is fully charged. The second indicator may output multiple indications indicative of multiple charge states of the power storage device 260.

In one exemplary embodiment, the second indicator may output multiple indications by outputting light in more than one color. In this embodiment, for example, the second indicator may (a) indicate to a user that the power storage device 260 is fully charged by outputting green light; (b) indicate to the user that the power storage device 260 is not fully charged by not outputting light; and (c) indicate to the user that a problem has occurred with the power storage device 260 or detachable charging unit by outputting red light.

In another exemplary embodiment, the second indicator may output multiple indications by outputting light in more than one shape. As illustrated in FIGS. 1A and 1B, for example, the second indicator may output an image of a battery. The second indicator may output (a) an image of an empty battery in response to a determination that power storage device 260 is empty or nearly empty; (b) an image of a full battery in response to a determination that power storage device 260 is fully charged or nearly fully charged; and/or (c) an image proportional to the amount of charge of the power storage device 260.

In another exemplary embodiment, the second indicator may output multiple indications out outputting light with more than one intensity level. In this example, the brightness of the light output by the second indicator may be indicative of the amount of charge of the power storage device 260.

Additionally or alternatively, the first indicator and/or the second indicator may output light with more than one intensity level, a steady light as well as a blinking light, and/or may output more than one sound.

Figure 6:
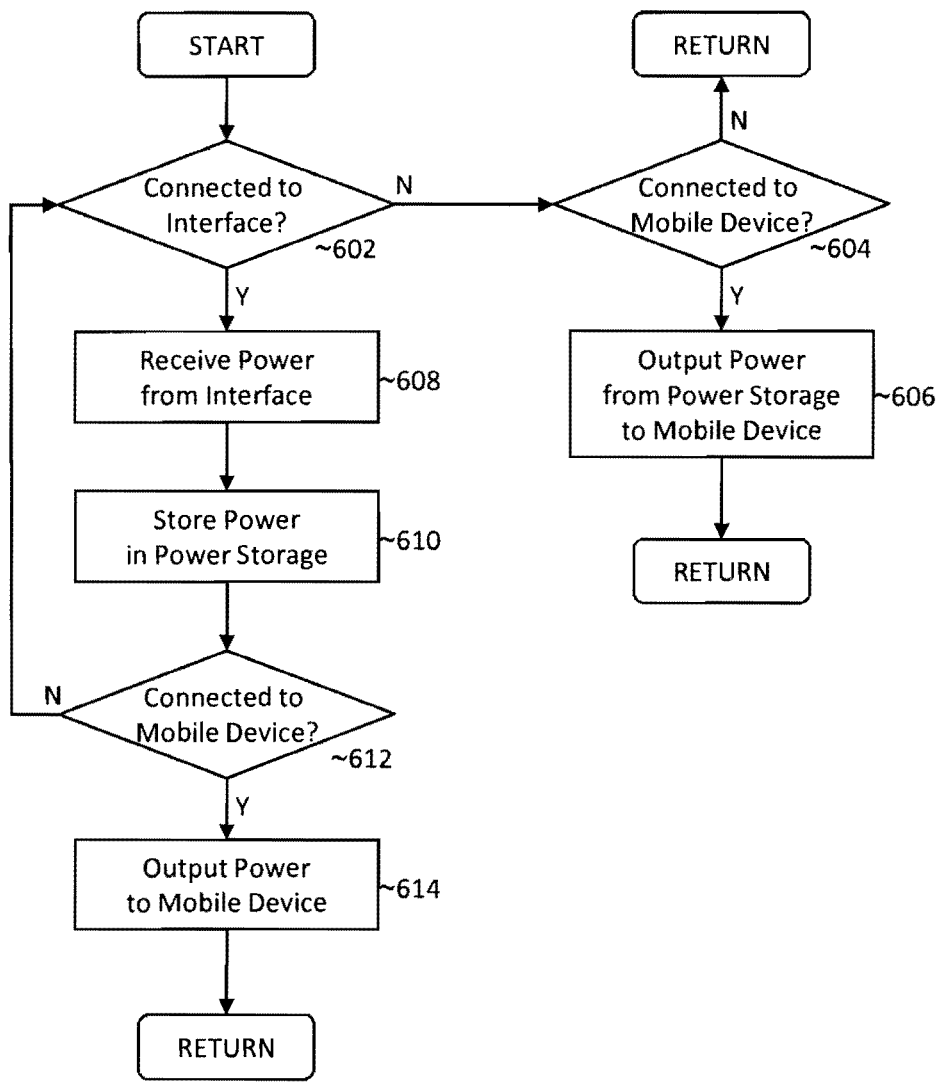
FIG. 6 is a flowchart of a method of outputting power to a mobile device by the charging system illustrated in FIGS. 1A and 1B according to an exemplary embodiment of the present invention.

FIG. 6 is a flowchart illustrating a method of operation of the charging system 100 according to an exemplary embodiment of the present invention.

If the detachable charging unit 200 is not connected to the interface device 300 (Step 602: No) and the detachable charging unit 200 is connected to a mobile device (Step 604: Yes), the detachable charging unit 200 outputs power from the power storage device 260 to the mobile device in step 606.

On the other hand, if the detachable charging unit 200 is connected to the interface (Step 602: Yes), the detachable charging unit 200 receives power from the interface device 100 in step 608 and stores the power received from the interface device 100 in the power storage device in step 610. If the detachable charging unit 200 is connected to a mobile device (Step 612: Yes), the detachable charging unit 200 outputs power to the mobile device in step 614. Because the detachable charging unit 200 is connected to the interface device 300 in step 614, the detachable charging unit 200 may output the power stored in the power storage device 260 and/or power received from the interface device 300 to the mobile device.

As those skilled in the art will recognize in light of the above disclosure, changes or modifications may be made to the above-described embodiments without departing from the broad inventive concepts of the invention. For example, the system 100 may include a plurality of charging units 200 and/or interface devices 300. The charging unit 200 may include a plurality of mobile device ports 220, docking ports 240, power converters 250, power storage devices 260, charging unit management systems 270 (for example, a first charging unit management system 270 configured to control/regulate the charging of the power storage device 260 and a second charging unit management system 270 configured to control/regulate the charging of a battery of a mobile device connected to the charging unit 200), and/or visual indicators 280. The charging unit 200 may be configured to electrically connect with a plurality of mobile devices. The interface device 300 may include a plurality of charging unit ports 340, interface device management systems 370, audio ports 360, data ports 380, and/or vehicle connection ports 390. The power converters 250 may be located in the interface device 300 (for example, electrically connected between the vehicle connection port 390 and the charging unit port 340. Aspects of exemplary embodiments may be used in combination with other exemplary embodiments. For example, the charging unit 200 as shown and described with reference to FIGS. 2 and/or 3 may include the visual indicator 280 as shown and described with reference to FIG. 5.

Accordingly, is to be understood that this invention is not limited to the particular embodiments described herein, but is intended to include all changes and modifications that are within the scope and spirit of the invention.

What is claimed is:

1. A system, comprising:
an interface device configured to receive power from an electric system of a vehicle; and
a detachable charging unit configured to detachably couple with and electrically connect with the interface device, the detachable charging unit comprising:
a docking port configured to receive power from the interface device;
a power storage device configured to store the power received from the interface device; and
a mobile device port configured to output the power stored in the power storage device to a mobile device.

2. The system of claim 1, wherein the detachable charging unit is configured to output the power stored in the power storage device to the mobile device when the detachable charging unit is electrically disconnected from the interface device.

3. The system of claim 2, wherein the detachable charging unit is configured to store power in the power storage device when the detachable charging unit is electrically disconnected from the interface device.

4. The system of claim 2, wherein the detachable charging unit is further configured to output the power received from the interface device to the mobile device when the detachable charging unit is electrically connected to the interface device.

5. The system of claim 1, wherein the interface device comprises a charging unit port configured to output the power received from the electric system of the vehicle to the docking port of the detachable charging unit.

6. The system of claim 5, wherein the interface device further comprises a charging unit compartment configured to physically receive the detachable charging unit, and the charging unit port of the interface device is configured to electrically connect with the docking port of the detachable charging unit when the detachable charging unit is physically received by the charging unit compartment of the interface device.

7. The system of claim 1, wherein the interface device is further configured to send and receive data to and from an electronic system of the vehicle.

8. The system of claim 7, wherein the interface device is further configured to send and receive data to and from the detachable charging unit.

9. The system of claim 8, wherein the detachable charging unit is further configured to send and receive data to and from the mobile device.

10. The system of claim 9, wherein the system is configured to receive an audio signal from the mobile device and output the audio signal to the electronic system of the vehicle.

11. The system of claim 1, wherein the detachable charging unit further comprises a charging unit management system configured to control charging of the power storage device.

12. The system of claim 11, wherein the charging unit management system is configured to determine whether the power storage device is fully charged and interrupt a flow of power to the power storage device in response to a determination that the power storage device is fully charged.

13. The system of claim 11, wherein the charging unit management system is configured to determine a temperature of the power storage device and interrupt a flow of power to the power storage device in response to a determination that the temperature of the power storage device is outside a predetermined range.

14. The system of claim 1, wherein the detachable charging unit further comprises a visual indicator.

15. The system of claim 14, wherein the visual indicator is configured to output a visual indication indicative of an amount of charge of the power storage device.

16. The system of claim 14, wherein the visual indicator is configured to output a visual indication indicative of an amount of charge of a battery of the mobile device.

17. A method of outputting power from a vehicle to a mobile device, the method comprising:
receiving, by an interface device, power from an electric system of the vehicle
outputting, by the interface device, the power received from the electric system of the vehicle to a detachable charging unit configured to detachably couple with and electrically connect with the interface device;
storing, by the detachable charging unit, the power received from the interface device in a power storage device; and
outputting, by the detachable charging unit, the power stored in the power storage device to the mobile device.

18. The method of claim 17, wherein the outputting the power stored in the power storage device to the mobile device by the detachable charging unit comprises outputting the power stored in the power storage device to the mobile device by the detachable charging unit when the when the detachable charging unit is electrically disconnected from the interface device.

19. The method of claim 18, further comprising:
outputting, by the detachable charging unit, the power received from the interface device to the mobile device when the detachable charging unit is electrically connected to the interface device.

20. The method of claim 17, further comprising:
receiving, by the detachable charging unit, data from the mobile device;
outputting, by the detachable charging unit, the data received from the mobile device to the interface device;
outputting, by the interface device, the data received from the detachable charging unit to an electronic system of the vehicle.

* * * * *